April 3, 1928.
L. P. HYNES
THERMOSTAT
Filed March 24, 1923
1,664,778
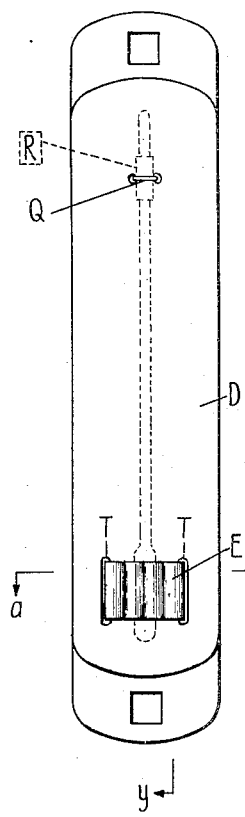
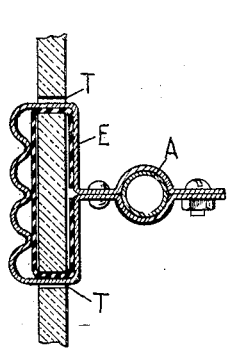
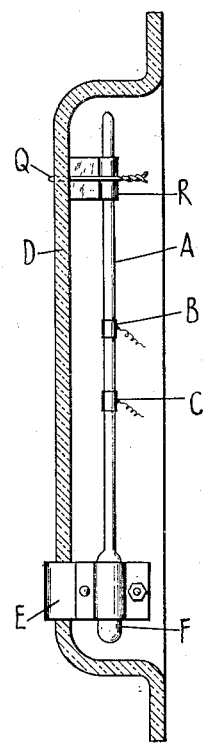
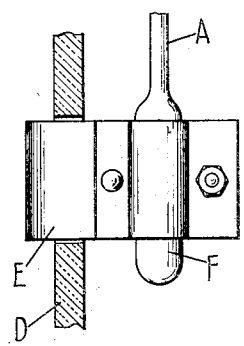
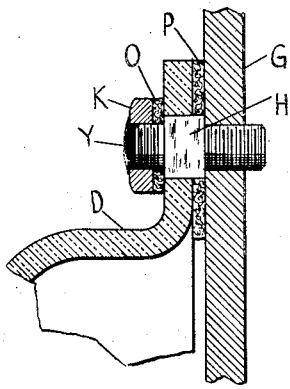
Inventor
LEE P. HYNES
By his Attorney
E. M. Bentley Patented Apr. 3, 1928.

1,664,778

UNITED STATES PATENT OFFICE.

LEE P. HYNES, OF ALBANY, NEW YORK, ASSIGNOR, BY MESNE ASSIGNMENTS, TO CONSOLIDATED CAR-HEATING COMPANY, INC., OF ALBANY, NEW YORK, A CORPORATION OF NEW YORK.

THERMOSTAT.

Application filed March 24, 1923. Serial No. 627,515.

For a detailed description of the present form of my invention, reference may be had to the following specification and to the accompanying drawing forming a part thereof, wherein Fig. 1 is a front elevation of my device;

Fig. 2 is a vertical section thereof on the line x—y of Fig. 1;

Fig. 3 a horizontal section of the front wall on the line a—b of Fig. 1;

Fig. 4 a side view of Fig. 3 and

Fig. 5 shows the lock-mounting of the device.

My invention relates to thermostats such as are used on railway cars to control the heating thereof. It has heretofore been customary to support such thermostats in a metal enclosure and in order to render the device sensitive, it has been necessary to thermally insulate said enclosure or casing from the bulb of the thermometer by a layer of fiber or similar material interposed between the casing and a metal sheet which is in contact with the bulb and extended through the front wall of the casing to an exposed position on the outside thereof. I have found it important, however, to more completely remove the bulb from the temperature effects of all metal parts excepting the metal sheet above mentioned. Much trouble has also been experienced by the removal of thermostats by the crew of the car.

To overcome these difficulties, I have provided for the thermometer a special casing of glass which is a poor heat-conducting material and is also transparent, whereby it becomes possible to inspect the electrical contacts mounted on the tube of the thermometer and to ascertain the working condition of the apparatus without removing it from its position on the car wall as has heretofore been necessary. This also permits me to effectually seal or lock the device in its position on the wall so that it can not be stolen. In the front wall of this glass casing I provide two vertical slots through which are passed the two branches of the metal temperature-detecting sheet heretofore described, and also two small holes for the passage of a wire loop by which the upper end of the thermometer tube is secured to the inside of the front wall of the casing. The lower end of the thermometer is also secured to the front wall of the casing by means of the metal detector sheet.

Referring to the drawing, A represents the tube of a mercury thermometer which, at its lower end, is enlarged to form the bulb F. On the tube A are the electrical contacts B and C formed by short metal sleeves each connected, in the usual way, with a short wire sealed in the glass of the tube to connect with the mercury therein. Owing to the permanency of the thermostat mounting by my invention, it becomes possible to eliminate the binding posts and connection board heretofore required and to connect these contacts directly to the leading-in wires at the back of the instrument. That reduces the cost and when once installed the connection need not be disturbed by inspections as heretofore. D is a moulded and pressed casing of transparent glass having substantial thickness and strength. On the back side of the front wall of said casing is secured the thermometer tube A. At its upper end the tube is spaced from said wall by a sheet metal bracket R, the inner end of which embraces the tube and which is secured to the wall by a wire loop Q which passes through holes in the glass. At its lower bulb end the tube is supported by the metal sheet E which passes through the vertical slots T T in the front wall of the casing, leaving a corrugated surface exposed to the atmosphere of the car. The two ends within the casing are clamped about the bulb F.

Referring to Fig. 5, the wall of the car is indicated at G. A square standard H is screwed into the wall G and a square hole in the flat back of the casing D fits over the square part with a layer P of soft felt behind it. Then a nut K with an underlying washer of felt O is screwed outside the casing and effectively soldered or brazed to the standard at Y so that it can not be unscrewed without resort to a hot iron. By this means the instrument is permanently and effectively locked and sealed to the wall so that it can not be readily stolen or removed. This becomes feasible since the transparency of the casing permits inspection without removal.

What I claim as new and desire to secure by Letters Patent is:

1. A thermostat comprising a hollow casing open at the back, said casing being constructed of a material of low heat conductivity, a thermometer tube mounted within said casing and provided with electric contacts, and a temperature detector passed through the casing wall and presenting an extended surface of metal exteriorly thereof, said temperature detector being in thermal conducting contact with the thermometer bulb within the casing.

2. A thermostat comprising a hollow casing open at the back, said casing being constructed of a transparent material of low heat conductivity, a thermometer tube mounted within said casing and provided with electric contacts in a position to be visible through the casing wall, a temperature detector passed through the casing wall and presenting an extended surface of metal exteriorly of said casing, said temperature detector being in thermal conducting contact with the thermometer bulb within the casing, and means for permanently locking the casing to a supporting wall.

3. A thermostat comprising a hollow casing constructed of low heat conducting material, a thermometer tube mounted within said casing and provided with electric contacts, and a metallic temperature detector exposed on the outside surface of said casing and maintained in thermal conducting contact with the thermometer bulb.

4. A thermostat comprising a casing of transparent glass so as to provide a wall of low heat conductivity, and a thermometer tube located on the rear side of said casing and provided with electric contacts, and a metallic temperature detector extending over a portion of the front surface of said casing, and having a heat conductor passing through the glass wall of said casing and thermally connected with the bulb of the thermometer.

5. A thermostat comprising a casing constructed of transparent material of low heat conductivity and open at the back, a thermometer tube located within said casing so as to be visible through the wall thereof, said thermometer tube having electric contacts, and a temperature detector having an exposed portion of substantial area extended over a contiguous portion of the outside surface of said casing and having a portion passed through the wall of the casing and in thermal contact with the thermometer bulb, said temperature detector forming a part of the thermometer tube supporting means.

6. A thermostat comprising a casing constructed of transparent material of low heat conductivity and open at the back, a thermometer tube located within said casing so as to be visible through the wall thereof, said thermometer tube having electric contacts, and a temperature detector having an exposed portion of substantial area extended over a contiguous portion of the outside surface of said casing and having a portion passed through the wall of the casing and in thermal contact with the thermometer bulb, said temperature detector forming a part of the thermometer tube supporting means, and means for permanently locking the casing to a supporting wall.

7. A thermostat comprising a hollow casing constructed of low heat conducting material, said casing having slots in the wall thereof, a metallic temperature detector having a portion exposed on the outside surface of the casing and other portions extended inwardly through said slots, and a thermometer tube located within said casing and provided with electric contacts, the bulb of said thermometer tube being maintained in thermal conducting contact with said temperature detector.

8. A thermostat comprising a hollow casing constructed of low heat conducting material, said casing being provided with slots, a metallic temperature detector having a corrugated outer portion extending over a contiguous portion on the outside surface of said casing, said detector having inwardly extended portions projecting through said slots, a thermometer tube within said casing and provided with electric contacts, and means carried by the inwardly extended portions of said temperature detector for engaging the bulb of the thermometer and maintaining a thermal conducting contact therewith.

Signed at Albany, county of Albany and State of New York, this 22nd day of March, 1923.

LEE P. HYNES.